(12) United States Patent
Kim

(10) Patent No.: US 7,612,130 B2
(45) Date of Patent: Nov. 3, 2009

(54) COMPOSITION OF POLYESTER, AROMATIC EPOXY COMPOUND AND EPOXY-FUNCTIONAL POLYOLEFIN AND/OR COPOLYESTER

(75) Inventor: Sung Dug Kim, Newburgh, IN (US)

(73) Assignee: Sabic Innovative Plastics IP B.V. (NL)

( * ) Notice: Subject to any disclaimer, the term of this patent is extended or adjusted under 35 U.S.C. 154(b) by 359 days.

(21) Appl. No.: 11/581,247

(22) Filed: Oct. 16, 2006

(65) Prior Publication Data

US 2008/0090965 A1  Apr. 17, 2008

(51) Int. Cl.
  C08K 3/40 (2006.01)
  C08L 67/03 (2006.01)
(52) U.S. Cl. ........................ 523/467; 523/436; 523/437; 525/65; 525/108; 525/111
(58) Field of Classification Search .................. None
  See application file for complete search history.

(56) References Cited

U.S. PATENT DOCUMENTS

| | | | |
|---|---|---|---|
| 2,465,319 A | 3/1949 | Whinfield et al. | |
| 3,078,254 A | 2/1963 | Zelinski et al. | |
| 3,265,765 A | 8/1966 | Holden et al. | |
| 3,297,793 A | 1/1967 | Dollinger | |
| 3,402,159 A | 9/1968 | Hsieh | |
| 3,405,198 A | 10/1968 | Rein et al. | |
| 3,594,452 A | 7/1971 | De La Mare et al. | |
| 3,769,260 A | 10/1973 | Segal | |
| 4,119,607 A | 10/1978 | Gergen et al. | |
| 4,154,775 A | 5/1979 | Axelrod | |
| 4,172,859 A | 10/1979 | Epstein | |
| 4,292,233 A | 9/1981 | Binsack et al. | |
| 4,327,764 A | 5/1982 | Biederman et al. | |
| 4,364,280 A | 12/1982 | Kutsay | |
| 4,739,012 A | 4/1988 | Hagman | |
| 4,753,980 A | 6/1988 | Deyrup | |
| 5,030,698 A * | 7/1991 | Mulhaupt et al. | 525/423 |
| 5,068,283 A | 11/1991 | Ohmae et al. | |
| 5,302,645 A | 4/1994 | Nakano et al. | |
| 5,367,011 A | 11/1994 | Walsh | |
| 5,411,999 A | 5/1995 | Gallucci | |
| 5,596,049 A * | 1/1997 | Gallucci et al. | 525/438 |
| 5,804,654 A | 9/1998 | Lo et al. | |
| 6,255,371 B1 | 7/2001 | Schlosser et al. | |
| 7,405,249 B2 * | 7/2008 | Kim | 524/114 |
| 2005/0261410 A1 | 11/2005 | Waggoner et al. | |
| 2006/0160453 A1 | 7/2006 | Suh | |
| 2007/0049667 A1* | 3/2007 | Kim et al. | 524/127 |

FOREIGN PATENT DOCUMENTS

| | | | |
|---|---|---|---|
| CA | 2140195 A | * | 7/1995 |
| EP | 0285256 A2 | | 10/1988 |
| EP | 0663424 A2 | | 7/1995 |
| EP | 0786495 A2 | | 7/1997 |
| GB | 1264741 | | 2/1972 |

OTHER PUBLICATIONS

Use of a Resin Composition From a Linear High-Molecular Polyester and an Olefincopolymer, EP 0663424, Publication Date: Jul. 19, 1995, Abstract, 1 page.

* cited by examiner

*Primary Examiner*—Robert Sellers
(74) *Attorney, Agent, or Firm*—Cantor Colburn LLP

(57) ABSTRACT

A composition contains a polyester; an aromatic epoxy compound, in an amount sufficient to provide 5 to 300 milliequivalents of epoxy per kilogram of polyester; and 0.5 to 6 weight percent, based on the weight of the polyester, and an ethylene-glycidyl methacrylate containing copolymer; and/or a copolyester copolymer, wherein the copolyester comprises, based on the weight of the copolyester, 15 to 95 weight percent of polyester units derived from the reaction of a C6-C24 aromatic dicarboxylic acid or a chemical equivalent thereof with a C2-C6 aliphatic diol, and 5 to 85 weight percent of polyester units derived from the reaction of a C6-C24 aromatic dicarboxylic acid or a chemical equivalent thereof with a poly(alkylene oxide) glycol having a molecular weight of 400-6,000 and a carbon to oxygen ratio of 2.0-4.3. The compositions have excellent hydrolytic resistance, and are suitable for making automotive and electronic parts.

28 Claims, No Drawings

COMPOSITION OF POLYESTER, AROMATIC EPOXY COMPOUND AND EPOXY-FUNCTIONAL POLYOLEFIN AND/OR COPOLYESTER

BACKGROUND OF THE INVENTION

This disclosure relates to polyester compositions, in particular polyester and copolyester compositions having increased hydrolytic resistance.

Polyesters, copolyesters and their blends with other thermoplastics have a number of advantageous properties, including high mechanical strength and good processability. This makes polyester compositions useful in the manufacture of a wide variety of goods, including automotive parts, home appliances, and electronic devices. Since many of these applications are used under conditions of heat and/or humidity, it is desirable to provide such compositions with improved stability under these conditions. It would further be advantageous if the compositions were stable to heat and/or humidity without substantially adversely affecting other advantageous properties of polyesters.

BRIEF DESCRIPTION OF THE INVENTION

In one aspect, the present disclosure relates to an improved thermoplastic composition, which comprises a polyester; an aromatic epoxy compound, in an amount sufficient to provide 5 to 300 milliequivalents of epoxy per kilogram of polyester; and 0.5 to 6 weight percent, based on the weight of the polyester, of one or both of epoxy-functionalized polyolefin elastomer, wherein the copolyester copolymer comprises, based on the weight of the copolyester, 15 to 95 weight percent of polyester units derived from the reaction of a C6-C24 aromatic dicarboxylic acid or a chemical equivalent thereof with a C2-C6 aliphatic diol, and 5 to 85 weight percent of polyester units derived from the reaction of a C6-C24 aromatic dicarboxylic acid or a chemical equivalent thereof with a poly(alkylene oxide) glycol having a molecular weight of 400-6,000 and a carbon to oxygen ratio of 2.0-4.3.

A method of forming a thermoplastic composition comprises combining the above-described components; and extruding the blend.

Another aspect of the present disclosure relates to an article comprising the above-described thermoplastic polyester composition.

Also described is a method of forming an article comprising extruding, forming, molding, or shaping the above-described thermoplastic polyester composition.

In another embodiment, the invention relates to a composition comprising a polyester component selected from the group consisting of poly(ethylene terephthalate), poly(1,4-butylene terephthalate), poly(ethylene naphthalate), poly(butylene naphthalate), (polytrimethylene terephthalate), poly(1,4-cyclohexylenedimethylene 1,4-cyclohexanedicarboxylate), poly(1,4-cyclohexylenedimethylene terephthalate) poly(cyclohexylenedimethylene-co-ethylene terephthalate), and combinations thereof, a glass filler; an aromatic epoxy compound is of the formula

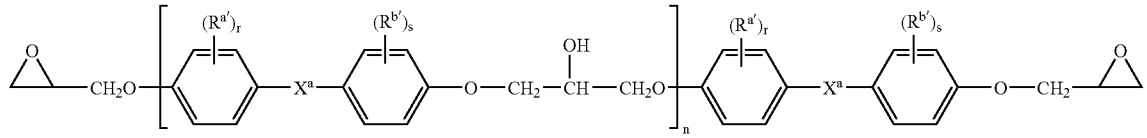

wherein $X^a$ is a substituted or unsubstituted $C_{1-8}$ alkylidene bridging group or a substituted or unsubstituted $C_{3-18}$ cycloalkylidene bridging group, n is 1 to 6, and x and y are each independently 0 to 4, in an amount sufficient to provide 5 to 300 milliequivalents of epoxy per kilogram of polyester; an alkali metal salt of a $C_8$-$C_{36}$ carboxylic acid catalyst; and 0.5 to 6 weight percent, based on the weight of the polyester, of one or both of an ethylene-methyl acrylate-glycidyl methacrylate terpolymer and/or copolyester copolymer wherein the copolyester comprises, based on the weight of the copolyester, 15 to 95 weight percent of polyester units derived from the reaction of terephthalic acid or chemical equivalent thereof with butanediol, and 5 to 85 weight percent of polyester units derived from the reaction of a terephthalic acid and poly(tetramethylene oxide) glycol having a molecular weight of 600-2,000.

In another embodiment, relates to a polybutylene terephthalate polyester; glass filler; n aromatic epoxy compound is of the formula

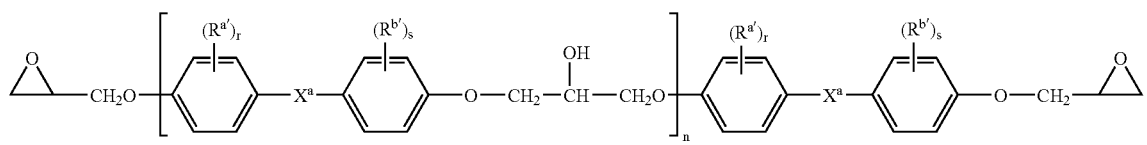

wherein $X^a$ is isopropylidene, n is 1 to 6, and x and y are each independently 0 to 2, in an amount sufficient to provide 5 to 300 milliequivalents of epoxy per kilogram of polyester; an alkali metal salt of a $C_8$-$C_{36}$ carboxylic acid catalyst; and 0.5 to 6 weight percent, based on the weight of the polyester, of one or both of an ethylene-methyl acrylate-glycidyl methacrylate terpolymer and/or a copolyester copolymer wherein the copolyester comprises, based on the weight of the copolyester, 15 to 95 weight percent of polyester units derived from the reaction of terephthalic acid or chemical equivalent thereof with butanediol, and 5 to 85 weight percent of polyester units derived from the reaction of a terephthalic acid and poly(tetramethylene oxide) glycol having a molecular weight of 600-2,000.

Various other features, aspects, and advantages of the present invention will become more apparent with reference to the following description, examples, and appended claims.

DETAILED DESCRIPTION OF THE INVENTION

The present inventors have discovered that the thermal aging resistance properties of polyester compositions can be significantly improved by the addition of an aromatic epoxy compound and an elastomeric component. The elastomeric component comprises one or both of an epoxy-functionalized polyolefin copolymer and/or a specific type of copolyester copolymer, in particular, a copolyester containing elastomeric poly(alkylene oxide) units. Such improvement can be obtained without sacrificing other advantageous properties, for example good mechanical properties and processability. The particular combination of a polyester, an aromatic epoxy compound and one or both of the foregoing elastomer-containing components has not been disclosed in the prior art.

The singular forms "a", "an" and "the" include plural referents unless the context clearly dictates otherwise. As used herein, the "(meth)acryl" prefix includes both the methacryl and acryl. "Optional" or "optionally" means that the subsequently described event or circumstance can or can not occur, and that the description includes instances where the event occurs and instances where it does not. All ranges disclosed herein are inclusive of the endpoints, and the endpoints are independently combinable with each other. All references are incorporated herein by reference in their entirety.

Polyesters used herein include crystalline polyesters such as polyesters derived from a C2-C20 aliphatic or cycloaliphatic diol, or mixtures thereof and at least one aliphatic and/or aromatic dicarboxylic acid. Such polyesters have repeating units of formula (I)

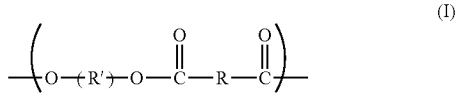

(I)

wherein R' is a C2-C20 alkylene or C5-C20 cycloalkylene radical compromising a dehydroxylated residue derived from an aliphatic or cycloaliphatic diol, or a combination thereof, and R is a C6-C20 arylene, C2-C20 alkylene, or C6-C20 cycloalkylene radical comprising a decarboxylated residue derived from an aromatic or cycloaliphatic dicarboxylic acid. In one embodiment the polyester is an aliphatic polyester where at least one of R' or R is a cycloalkyl-containing radical.

Exemplary dicarboxylic acids are cyclo or bicyclo aliphatic acids, for example, decahydro naphthalene dicarboxylic acids, norbornene dicarboxylic acids, bicyclo octane dicarboxylic acids, 1,4-cyclohexanedicarboxylic acid or chemical equivalents, specifically trans-1,4-cyclohexanedicarboxylic acid or a chemical equivalent thereof. Linear aliphatic dicarboxylic acids such as adipic acid, azelaic acid, dicarboxyl dodecanoic acid, and succinic acid can also be useful. Chemical equivalents of these diacids include esters, alkyl esters, e.g., dialkyl esters, diaryl esters, anhydrides, salts, acid chlorides, acid bromides, and the like. Examples of aromatic dicarboxylic acids from which the decarboxylated residue R can be derived are acids that contain a single aromatic ring per molecule such as isophthalic acid, terephthalic acid, 1,2-di(p-carboxyphenyl)ethane, 4,4'-dicarboxydiphenyl ether, 4,4'-bisbenzoic acid and mixtures thereof, as well as acids that contain fused rings such as 1,4- or 1,5-naphthalene dicarboxylic acids. In one embodiment, the dicarboxylic acid precursor of residue R is terephthalic acid or, alternatively, a mixture of terephthalic and isophthalic acids.

Exemplary diols useful in the preparation of the polyesters re straight chain, branched, or cycloaliphatic alkane diols such as ethylene glycol, propylene glycol, i.e., 1,2- and 1,3-propylene glycol, 2,2-dimethyl-1,3-propane diol, 2-ethyl-2-methyl-1,3-propane diol, 1,4-butane diol, 1,4-but-2-ene diol, 1,3- and 1,5-pentane diol, dipropylene glycol, 2-methyl-1,5-pentane diol, 1,6-hexane diol, dimethanol decalin, dimethanol bicyclooctane, 1,4-cyclohexane dimethanol, including its cis- and trans-isomers, triethylene glycol, 1,10-decanediol; and mixtures comprising at least of the foregoing diols. Chemical equivalents of the diols include esters, such as dialkylesters, diaryl esters, and the like.

The polyesters resin can be linear or branched, homopolymeric or copolymeric, i.e., having more than one type of R and/or R' group.

Exemplary polyesters include poly(ethylene terephthalate) ("PET"), poly(1,4-butylene terephthalate), ("PBT"), poly(ethylene naphthalate) ("PEN"), poly(butylene naphthalate), ("PBN"), poly(propylene terephthalate) ("PPT"), poly(cyclohexane dimethanol terephthalate) ("PCT"), poly(cyclohexane-1,4-dimethylene cyclohexane-1,4-dicarboxylate) also known as poly(1,4-cyclohexanedimethanol 1,4-dicarboxylate) ("PCCD"), poly(cyclohexanedimethanol terephthalate), poly(cyclohexylenedimethylene-co-ethylene terephthalate), cyclohexanedimethanol-terephthalic acid-isophthalic acid copolymers and cyclohexanedimethanol-terephthalic acid-ethylene glycol ("PCTG" or "PETG") copolymers. When the molar proportion of cyclohexanedimethanol is higher than that of ethylene glycol the polyester is termed PCTG. When the molar proportion of ethylene glycol is higher than that of cyclohexane dimethanol the polyester is termed PETG.

The polyesters can be obtained by methods well known to those skilled in the art, including, for example, interfacial polymerization, melt-process condensation, solution phase condensation, and transesterification polymerization. Such polyester resins are typically obtained through the condensation or ester interchange polymerization of the diol or diol equivalent component with the diacid or diacid chemical equivalent component. Methods for making polyesters and the use of polyesters in thermoplastic molding compositions are known in the art. Conventional polycondensation procedures are described in the following, see, generally, U.S. Pat. Nos. 2,465,319, 5,367,011 and 5,411,999. The condensation reaction can be facilitated by the use of a catalyst, with the choice of catalyst being determined by the nature of the reactants. The various catalysts are known in the art. For example, a dialkyl ester such as dimethyl terephthalate can be transesterified with butylene glycol using acid catalysis, to generate poly(butylene terephthalate). It is possible to use a branched polyester in which a branching agent, for example, 'a glycol having three or more hydroxyl groups or a trifunctional or multifunctional carboxylic acid has been incorporated.

The polyesters can have an intrinsic viscosity (as measured in phenol/tetrachloro ethane (60:40, volume/volume ratio) at 25° C.) from 0.2 to 2.0 deciliters per gram, and a weight average molecular weight from 5,000 to 130,000 g/mol, specifically 10,000 to 120,000 g/mol against polystyrene standard, as measured by gel permeation chromatography in chloroform/hexafluoroisopropanol (5:95, volume/volume ratio) at 25° C. The polyesters can have various known end groups.

A mixture of polyester resins with differing viscosities can be used to make a blend to allow for control of viscosity of the final formulation. Blends of polyesters can also be used in the composition. Exemplary polyester blends comprise poly(ethylene terephthalate) and poly(1,4-butylene terephthalate).

"Aromatic epoxy compound" as used herein refers to compounds comprising at least one aromatic moiety and at least one epoxy functionality. Other functional groups, e.g., carboxylic acids, carboxylic acid esters, halogens, nitrile, nitro, sulfhydryl, alkoxy, aryloxy, and the like can also be present. In one embodiment, the aromatic epoxy compound will contain only carbon, hydrogen, and oxygen, and will have an epoxy equivalent weight of 10 to 5,000, more specifically 50 to 4,000, even more specifically 100 to 3,000. In another embodiment, the aromatic epoxy compound will contain only bromine, carbon, hydrogen, and oxygen, and will have an epoxy equivalent weight of 10 to 5,000, more specifically 50 to 4,000, even more specifically 100 to 3,000.

Exemplary aromatic epoxy compounds correspond to the structure (III)

wherein $X^a$ and n are as described above, and x and y are each independently 0 to 4. Compounds represented by formula (III) include glycidyl ether compounds of tetrabromobisphenol A.

Effective amounts of the aromatic epoxy compound are readily determined by one of ordinary skill in the art without undue experimentation, based on the amount and type of polyester, the amount and type of epoxide, and the amount and type of catalyst, using the guidance provided herein. Typically, small amounts are used, for example amounts effective to provide 5 to 300 milliequivalents of epoxy per kg of polyester, more specifically, 150 to 300 milliequivalents of epoxy per kilogram of polyester.

The compositions disclosed herein further comprise one or both of an epoxy-functionalized polyolefin copolymer and/or a copolyester copolymer comprising polyoxyalkylene units.

Epoxy-functionalized polyolefin copolymers include polyethylene, polypropylene, polybutylene, and the like, together with glycidyl (meth)acrylate units. The copolymers can further comprise additional units, for example C1-C4 alkyl (meth)acrylate units. In one embodiment, the epoxy-functionalized polyolefin copolymer is terpolymeric, comprising polyethylene blocks, methyl acrylate blocks, and glycidyl methacrylate blocks. Such terpolymers comprise, based on the total weight of the copolymer, 0.3 to 12 weight percent of glycidyl methacrylate units, more specifically 0.4 to 11 weight percent of glycidyl methacrylate units, even more specifically 0.5 to 10 weight percent of glycidyl methacrylate units. Suitable epoxy-functionalized polyolefin copolymers include the ethylene-methyl acrylate-glycidyl methacrylate

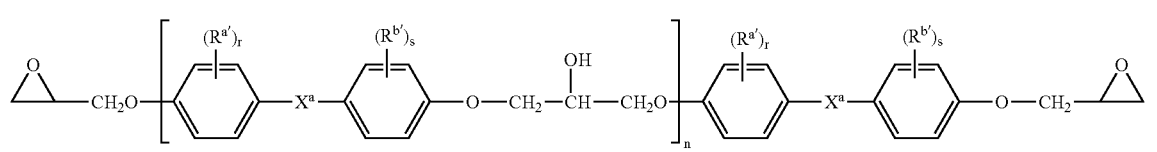

wherein $R^{a'}$ and $R^{b'}$ are each independently halogen or $C_{1-12}$ alkyl, $X^a$ is a substituted or unsubstituted $C_{1-18}$ alkylidene bridging group or a substituted or unsubstituted $C_{3-18}$ cycloalkylidene bridging group, n is 1 to 6, and r and s are each independently 0 to 4. Exemplary aromatic epoxy compounds of this type include bisphenol epoxy resins, specifically bisphenol-A epoxy resins, bisphenol-F epoxy resins, and the like. The aromatic epoxy compounds are commercially available.

In some embodiments, it is advantageous to use brominated aromatic epoxy compounds, for example compounds corresponding to formula (III)

terpolymer comprising 8 weight percent glycidyl methacrylate units available from Atochem under the trade name LOTADER AX8900.

Suitable copolyester copolymers comprise two different types of polyester units, in particular from 15 to 95 weight percent of polyester units derived from the reaction of an aromatic dicarboxylic acid with an aliphatic diol; and from 5 to 85 weight percent of polyester units derived from the reaction of an aromatic dicarboxylic acid, with a poly(alkylene oxide) glycol. Chemical equivalents of the aromatic dicarboxylic acid, aliphatic diol and/or poly(alkylene oxide) glycol as described above can be used.

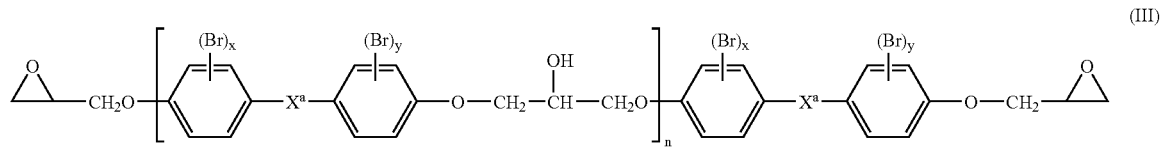

Suitable aromatic dicarboxylic acids used for the manufacture of the copolyester copolymer include $C_{6-24}$ aromatic dicarboxylic acid, more specifically a $C_{8-12}$ aromatic dicarboxylic acid, or chemical equivalent thereof. Examples include, but are not limited to, terephthalic acid, isophthalic acid, naphthalenedicarboxylic acid, and a combination comprising at least one of the foregoing dicarboxylic acids. In one embodiment, the aromatic dicarboxylic acid is terephthalic acid.

The aliphatic diol used for the synthesis of the copolyester copolymer is a $C_{2-6}$ aliphatic diol, such as 1,2-ethylene glycol, 1,2- and 1,3-propylene glycol, 1,4-butylene glycol, 2,2-dimethyl-1,3-propane diol, 2-ethyl-2-methyl-1,3-propane diol, 1,3- and 1,5-pentane diol, dipropylene glycol, 2-methyl-1,5-pentane diol, 1,6-hexane diol, and the like, and a combination comprising at least one of the foregoing aliphatic diols. In one embodiment, the aliphatic diol is 1,4-butylene glycol.

The poly(alkylene oxide) glycol has a molecular weight of 200-10,000 grams per mole, more specifically 400-6,000 grams per mole, even more specifically 600-2,000 grams per mole, and a carbon to oxygen ratio of 1-10, more specifically 1.5-6, even more specifically 2.0-4.3.

In one aspect, the copolyester copolymer is a block copolymer, wherein one block consists of poly(butylene terephthalate) and another block consists of a poly(alkylene oxide) of 600-2,000 grams per mole, having a carbon to oxygen ratio of 2.0-4.3. Such copolyester copolymers can be obtained from E. I. DuPont de Nemours and Company under the trade name HYTREL.

Suitable amounts of the epoxy-functionalized polyolefin copolymer and/or the copolyester copolymer will depended on the type and amount of polyester, other additives (if present), and desired properties, and are readily determined by one of ordinary skill in the art without undue experimentation. Typically, from 0.1 to 10 weight percent, more specifically 0.3 to 8 weight percent, even more specifically 0.5 to 6 weight percent of the epoxy-functionalized polyolefin copolymer and/or the copolyester copolymer (alone or in combination) can be used, based on the total weight of the polyester.

In some embodiments, a catalyst effective to cure the aromatic epoxy compound can be used. Catalysts can be selected from hydroxides, hydrides, amides, carbonates, borates, phosphates, $C_{2-18}$ enolates, $C_{2-36}$ dicarboxylates, $C_{2-36}$ metal carboxylates, Lewis acids, $C_{1-36}$ tetraalkyl ammonium hydroxides or acetates, $C_{1-36}$ tetraalkyl phosphonium hydroxides or acetates, alkali or alkaline earth metal salts of a negatively charged polymer, or a combination comprising at least one of the foregoing catalysts. Specific catalysts are sodium stearate, sodium carbonate, sodium acetate, sodium bicarbonate, sodium benzoate, sodium caproate, potassium oleate, boron compounds, or a combination comprising at least one of the foregoing specific catalysts.

Effective amounts of the catalyst component are readily determined by one of ordinary skill in the art without undue experimentation, based on the amount and type of polyester, the amount and type of epoxide, and the amount and type of catalyst. In general, the amount of catalyst is selected so as to provide effective flow enhancement and thermal aging resistance, and can be from 0.001 to 1 weight percent, more specifically 0.003 to 0.1 weight percent, based on the total weight of the composition.

The polyester compositions disclosed herein have improved retention of impact properties after heat aging, and improved hydrolytic resistance, compared to polyester compositions without the aromatic epoxy compound, copolyester copolymer or epoxy-functionalized polyolefin copolymer.

An article molded from a polyester composition comprising an aromatic epoxy compound, copolyester copolymer and/or epoxy-functionalized polyolefin copolymer, and optional catalyst retains at least 70%, more specifically at least 75%, even more specifically at least 80% of tensile stress after aging at 110° C. and 100% relative humidity for 48 hours when measured in accordance with ASTM D638. The article retains at least 60%, more specifically at least 65%, even more specifically at least 70% of tensile stress after aging at 110° C. and 100% relative humidity for 120 hours when measured in accordance with ASTM D638.

In a particularly advantageous embodiment, an improvement in impact properties is observed under conditions of heat, humidity, and pressure similar to those encountered during autoclaving. Accordingly, an article comprising a polyester, an aromatic epoxy compound, copolyester copolymer and/or epoxy-functionalized polyolefin copolymer, and optional catalyst retains more of a tensile property after aging under conditions of high heat, humidity, and pressure than the same composition without the combination of aromatic epoxy compound, copolyester copolymer or epoxy-functionalized polyolefin-based elastomer, and optional catalyst. Specifically, an article molded from a polyester composition comprising an aromatic epoxy compound, copolyester copolymer and/or epoxy-functionalized polyolefin copolymer, and optional catalyst retains at least 60%, more specifically at least 65%, even more specifically at least 70% of its tensile stress after aging at 110° C. for 120 hours at 100% relative humidity and 140 kilopascals, and at least 70%, more specifically at least 75%, even more specifically at least 80% of its tensile stress after aging at 110° C. for 48 hours at 100% relative humidity and 140 kilopascals, measured in accordance with ASTM D638.

The disclosed composition can further comprise an impact modifier(s). Suitable impact modifiers include high molecular weight elastomeric materials derived from olefins, monovinyl aromatic monomers, acrylic and methacrylic acids and their ester derivatives, organosiloxane rubbers, as well as conjugated dienes, and other acrylic impact modifiers. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used.

The acrylic rubber is preferably core-shell polymers built up from a rubber-like core on which one or more shells have been grafted. Typical core material consists substantially of an acrylate rubber. Preferable the core is an acrylate rubber of derived from a C4 to C12 acrylate. Typically, one or more shells are grafted on the core. Usually these shells are built up for the greater part from a vinyl aromatic compound and/or a vinyl cyanide and/or an alkyl(meth)acrylate and/or (meth) acrylic acid. Preferable the shell is derived from an alkyl (meth)acrylate, more preferable a methyl(meth)acrylate. The core and/or the shell(s) often comprise multi-functional compounds that can act as a cross-linking agent and/or as a grafting agent. These polymers are usually prepared in several stages. The preparation of core-shell polymers and their use as impact modifiers are described in U.S. Pat. Nos. 3,864,428 and 4,264,487. Especially preferred grafted polymers are the core-shell polymers available from Rohm & Haas under the trade name PARALOID®, including, for example, PARALOID® EXL3691 and PARALOID® EXL3330, EXL3300 and EXL2300. Core shell acrylic rubbers can be of various particle sizes. The preferred range is from 300-800 nm, however larger particles, or mixtures of small and large particles, can also be used. In some instances, especially where good appearance is required acrylic rubber with a particle size of 350-450 nm can be preferred. In other applications where higher impact is desired acrylic rubber particle sizes of 450-550 nm or 650-750 nm can be employed.

Acrylic impact modifiers contribute to heat stability and UV resistance as well as impact strength of polymer compositions. Other preferred rubbers useful herein as an impact modifier is an elastomer-modified graft copolymer comprising (i) an elastomeric (i.e., rubbery) polymer substrate having a glass temperature ($T_g$) less than 10° C., more specifically less than −10° C., or more specifically −40° to −80° C., and (ii) a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than 50 wt. % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl (meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_{1-6}$ esters of acrylic acid and methacrylic acid, specifically methyl methacrylate.

Typical other rubbers for use as impact modifiers herein are the butadiene core-shell polymers of the type available from Rohm & Haas under the trade name PARALOID® EXL2600. Most preferably, the impact modifier will comprise a two stage polymer having a butadiene based rubbery core, and a second stage polymerized from methyl methacrylate alone or in combination with styrene. Impact modifiers of the type also include those that comprise acrylonitrile and styrene grafted onto cross-linked butadiene polymer, which are disclosed in U.S. Pat. No. 4,292,233 herein incorporated by reference.

Other suitable impact modifiers can be mixtures comprising core shell impact modifiers made via emulsion polymerization using alkyl acrylate, styrene and butadiene. These include, for example, methyl methacrylate-butadiene-styrene (MBS) and methyl methacrylate-butylacrylate core shell rubbers.

Among the other suitable impact modifiers are the so-called block copolymers and rubbery impact modifiers, for example, A-B-A triblock copolymers and A-B diblock copolymers. The A-B and A-B-A type block copolymer rubber additives which can be used as impact modifiers include thermoplastic rubbers comprised of one or two alkenyl aromatic blocks which are typically styrene blocks and a rubber block, e.g., a butadiene block which can be partially hydrogenated. Mixtures of these triblock copolymers and diblock copolymers are especially useful.

Suitable A-B and A-B-A type block copolymers are disclosed in, for example, U.S. Pat. Nos. 3,078,254; 3,402,159; 3,297,793; 3,265,765; and 3,594,452 and U.K. Patent 1,264,741. Examples of typical species of A-B and A-B-A block copolymers include polystyrene-polybutadiene (SB), polystyrene-poly(ethylene-propylene), polystyrene-polyisoprene, poly(c-methylstyrene)-polybutadiene, polystyrene-polybutadiene-polystyrene (SBS), polystyrene-poly (ethylene-propylene)-polystyrene, polystyrene-polyisoprene-polystyrene and poly(α-methylstyrene)-polybutadiene-poly(α-methylstyrene), as well as the selectively hydrogenated versions thereof, and the like. Mixtures comprising at least one of the aforementioned block copolymers are also useful. Such A-B and A-B-A block copolymers are available commercially from a number of sources, including Phillips Petroleum under the trademark SOLPRENE, Shell Chemical Co., under the trademark KRATON, Dexco under the trade name VECTOR, and Kuraray under the trademark SEPTON.

The composition can also comprise a vinyl aromatic-vinyl cyanide copolymer. Suitable vinyl cyanide compounds include acrylonitrile and substituted vinyl cyanides such a methacrylonitrile. Preferably, the impact modifier comprises styrene-acrylonitrile copolymer (hereinafter SAN). The preferred SAN composition comprises at least 10, preferably 25 to 28, percent by weight acrylonitrile (AN) with the remainder styrene, para-methyl styrene, or alpha methyl styrene. Another example of SANs useful herein include those modified by grafting SAN to a rubbery substrate such as, for example, 1,4-polybutadiene, to produce a rubber graft polymeric impact modifier. High rubber content (greater than 50% by weight) resin of this type (HRG-ABS) can be especially useful for impact modification of polyester resins and their polycarbonate blends.

Another class of preferred impact modifiers, referred to as high rubber graft ABS modifiers, comprise greater than or equal to about 90% by weight SAN grafted onto polybutadiene, the remainder being free SAN. ABS can have butadiene contents between 12% and 85% by weight and styrene to acrylonitrile ratios between 90:10 and 60:40. Preferred compositions include: about 8% acrylonitrile, 43% butadiene and 49% styrene, and about 7% acrylonitrile, 50% butadiene and 43% styrene, by weight. These materials are commercially available under the trade names BLENDEX 336 and BLENDEX 415 respectively (Crompton Co.).

Improved impact strength is obtained by melt compounding polybutylene terephthalate with ethylene homo- and copolymers functionalized with either acid or ester moieties as taught in U.S. Pat. Nos. 3,405,198; 3,769,260; 4,327,764; and 4,364,280. Polyblends of polybutylene terephthalate with a styrene-alpha-olefin-styrene triblock are taught in U.S. Pat. No. 4,119,607. U.S. Pat. No. 4,172,859 teaches impact modification of polybutylene terephthalate with random ethylene-acrylate copolymers and EPDM rubbers grafted with a monomeric ester or acid functionality.

Specific exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN). Other specific impact modifiers include core-shell impact modifiers, such as those having a core of poly(butyl acrylate) and a shell of poly(methyl methacrylate).

Impact modifiers are generally present in amounts of 0.1 to 30 weight percent, more specifically 1 to 25 weight percent, even more specifically 5 to 15 weight percent, yet even more specifically 6 to 12 weight percent, based on the total weight of the polymers in the composition.

Additionally, the polyester compositions can further comprise particulate fillers, for example alumina, amorphous silica, anhydrous alumino silicates, mica, wollastonite, barium sulfate, zinc sulfide, clays, talc, and metal oxides such as titanium dioxide, carbon nanotubes, vapor grown carbon nanofibers, barites, calcium carbonate, milled glass, flaked glass, ground quartz, silica, zeolites, and solid or hollow glass beads or spheres, and fibrillated tetrafluoroethylene. Low levels (0.1-10.0 wt. %) of very small particle size (largest particles less than 10 microns in diameter) are preferred.

The polyester compositions can also be further blended with reinforcing fillers. Reinforcing fillers can comprise from 5 to 50 weight percent of the composition, preferably from 10 to 35 weight percent, based on the total weight of the composition. Advantageous reinforcing fillers are glass, ceramic and carbon and are well known in the art, as are their methods of manufacture. In one embodiment, glass is used as reinforcing filler, specifically glass that is relatively soda free, more specifically fibrous glass filaments comprised of lime-alumino-borosilicate glass, which are also known as "E" glass. The glass filaments can be made by standard processes, e.g., by steam or air blowing, flame blowing and mechanical pulling. It is advantageous for the glass filaments to be made by mechanical pulling. Fiber diameters used herein are 6 to 30 micrometers, specifically 8 to 20 micrometers, and more specifically 10 to 15 micrometers. In preparing the compositions, it is convenient to use the fiber in the form of chopped strands of ⅛ inch (3 mm) to ½ inch (13 mm) in length, although roving can also be used. In articles molded from the compositions, the fiber length is typically shorter, presumably due to fiber fragmentation during compounding of the composition. The length of such short glass fibers present in final molded compositions is less than 4 mm. The fibers can be treated with a variety of coupling agents to improve adhesion to the resin matrix. Specific coupling agents include, for example, amino, epoxy, amide or mercapto functionalized silanes. Organometallic coupling agents, for example, titanium or zirconium based organometallic compounds, can also be used. Other preferred sizing-coated glass fibers are commercially available from Owens Corning Fiberglass as, for example, OCF K filament glass fiber 183F. In some embodiments, it is advantageous to use E glass fibers having a diameter of 10 to 13 micrometers.

In another embodiment, long glass fibers can be used, wherein a continuous glass fiber bundle containing thousands of glass fiber monofilaments having a diameter from 10 to 24 micrometers, specifically 13 to 18 micrometers, is impregnated with a melted thermoplastic, e.g., a polyester. After cooling, the impregnated bundle is cut into pellets having a length of greater than 5 millimeters, specifically greater than 9 millimeters, using a pullout or pultrusion process. These pellets can be incorporated into the polyester compositions disclosed herein, to provide long glass fiber reinforced polyester compositions. Alternatively, a continuous pultrusion process can be used to incorporate the long glass fibers. The length of the long glass fibers is typically greater than that prepared by incorporation of short fibers and the predominant portion of the long glass fibers present have a length greater than 4 millimeters in the molded part. Such long glass fiber reinforced compositions can be used for different molding techniques such as injection molding, compression molding, thermoforming, and the like. As in the case of short fibers, the long fibers can also be treated with a variety of coupling agents to improve adhesion to resin.

Other fillers and reinforcing agents can be used alone or in combination with reinforcing fillers, e.g., the above-described particulate fillers, polyester fibers, aramid fibers.

The composition disclosed herein can comprise additional components that do not substantially interfere with the previously mentioned desirable properties, for example bis epoxy chain extenders, chain extension catalysts, monoepoxy chain terminators, flame retardants, heat stabilizers, antioxidants, colorants, including dyes and pigments, lubricants, mold release materials, nucleating agents, and ultra violet (UV) stabilizers. Examples of lubricants are alkyl esters, for example pentaerythritol tetrastearate (PETS), alkyl amides, such as ethylene bis-stearamide, and polyolefins, such as polyethylene.

In a specific embodiment, the composition includes a flame retarding component. The flame retarding component can be added to the composition to suppress, reduce, delay or modify the propagation of a flame through a composition or an article based on the composition. Specific exemplary flame retarding components include halogenated hydrocarbons (chlorine- and bromine-containing compounds and reactive flame retardants), inorganic flame retardants (boron compounds, antimony oxides, aluminum hydroxide, molybdenum compounds, zinc and magnesium oxides), phosphorous containing compounds (organic phosphates, phosphinates, phosphites, phosphonates, phosphines, halogenated phosphorus compounds and inorganic phosphorus-containing salts) and nitrogen containing compounds such as melamine cyanurate. Combinations comprising one or more of the foregoing types of flame retardant components can be used.

Specific inorganic flame retardants include metal hydroxides, antimony compounds, boron compounds, other metal compounds, phosphorous compounds, and other inorganic flame retarding compounds. Examples of suitable metal hydroxides include magnesium hydroxide, aluminum hydroxide, and other metal hydroxides. Examples of suitable antimony-based flame retardants include antimony trioxide, sodium antimonate, antimony pentoxide, and other antimony-based inorganic compounds. Examples of suitable boron compounds include zinc borate, boric acid, borax, as well as other boron-based inorganic compounds. Examples of other metal compounds include molybdenum compounds, molybdenum trioxide, ammonium octamolybdate (AOM), zirconium compounds, titanium compounds, zinc compounds such as zinc stannate, zinc hydroxy-stannate, as well as others, and combinations comprising at least one of the foregoing inorganic flame retardants.

Specific examples of suitable halogenated organic flame retardants tetrabromobisphenol A, octabromobiphenyl ether, decabromodiphenyl ether, bis(tribromophenoxy) ethane, tetrabromobiphenyl ether, hexabromocyclododecane, tribromophenol, bis(tribromophenoxy) ethane, tetrabromobisphenol A polycarbonate oligomers, and tetrabromobisphenol A epoxy oligomers. Typically halogenated aromatic flame retardants include tetrabromobisphenol A polycarbonate oligomer, which, if desired, are endcapped with phenoxy radicals, or with brominated phenoxy radicals, polybromophenyl ether, brominated polystyrene, brominated BPA polyepoxide, brominated imides, brominated polycarbonate, poly (haloaryl acrylate), poly(haloaryl methacrylate), e.g., poly (pentabromobenzyl)acrylate, or a combination comprising at least one of the foregoing. Also included within the class of halogenated flame retardants are brominated polystyrenes such as poly-dibromostyrene and polytribromostyrene, decabromobiphenyl ethane, tetrabromobiphenyl, brominated alpha, omega-alkylene-bis-phthalimides, e.g., N,N'-ethylene-bis-tetrabromophthalimide, oligomeric brominated carbonates, especially carbonates derived from tetrabromobisphenol A, and brominated epoxy resins.

Chlorinated flame retardants include chlorinated paraffins, and bis (hexachlorocyclopentadieno)cyclooctane, as well other such functionally equivalent materials.

Examples of suitable phosphorous-containing flame retardants include red phosphorus and ammonium polyphosphate, as well as organophoshorus flame retardants, e.g., halogenated phosphates and other non-halogenated compounds. Examples of such materials include tris(1-chloro-2-propyl) phosphate, tris(2-chloroethyl)phosphate, tris(2,3-dibromopropyl)phosphate, phosphate esters, trialkyl phosphates, triaryl phosphates, aryl-alkyl phosphates, and combinations thereof. Other flame retardants can include polyols, phosphonium derivatives, phosphonates, phosphanes, and phosphines.

Specific phosphorous-containing compounds include phosphates of the formula:

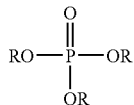

wherein each R is independently a $C_{1-18}$ alkyl, cycloalkyl, aryl, or arylalkyl, e.g., cyclohexyl, isopropyl, isobutyl, and the like; phosphonates of the formula:

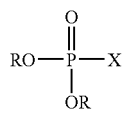

wherein X is H, and each R is independently a $C_{1-18}$ alkyl, cycloalkyl, aryl, or arylalkyl, e.g., cyclohexyl, isopropyl, isobutyl, and the like; phosphinates of the formula

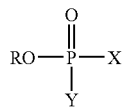

wherein X and Y is H, and R is a $C_{1-18}$ alkyl, cycloalkyl, aryl, or arylalkyl, e.g., cyclohexyl, isopropyl, isobutyl, and the like; phosphine oxides of the formula:

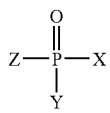

wherein X, Y, and Z are H and R, is a $C_{1-18}$ alkyl, cycloalkyl, aryl, arylalkyl, e.g., cyclohexyl, isopropyl, isobutyl, and the like; phosphines of the formula:

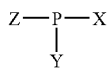

wherein X, Y, and Z is each independently a H, $C_{1-18}$ alkyl, cycloalkyl, aryl, arylalkyl, and the like; or phosphites of the formula:

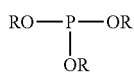

wherein each R is independently the same or different can be selected from the group of $C_{1-18}$ alkyl, cycloalkyl, aryl, or arylalkyl, e.g., cyclohexyl, isopropyl, isobutyl, and the like, and H.

As such, suitable flame retarding components that can be added can be organic compounds that include phosphorus, bromine, and/or chlorine. Non-brominated and non-chlorinated phosphorus-containing flame retardants can be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkylaryl, or aralkyl group, provided that at least one G is an aromatic group. Two of the G groups can be joined together to provide a cyclic group, for example, diphenyl pentaerythritol diphosphate, which is described by Axelrod in U.S. Pat. No. 4,154,775. Other suitable aromatic phosphates can be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl)p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like. Di- or polyfunctional aromatic phosphorus-containing compounds are also useful, for example, compounds of the formulas below:

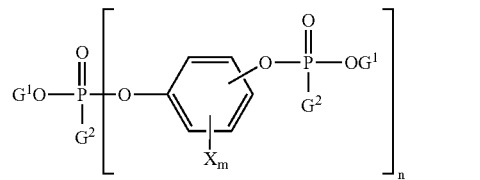

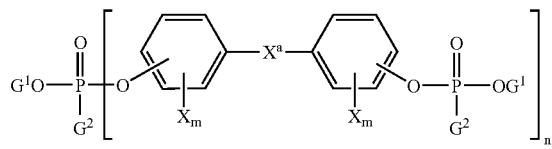

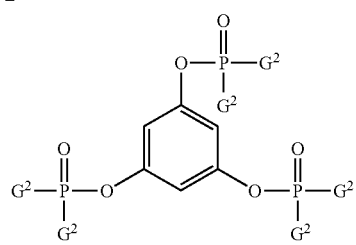

wherein each $G^1$ is independently a hydrocarbon having 1 to about 30 carbon atoms; each $G^2$ is independently a hydrocarbon or hydrocarbonoxy having 1 to about 30 carbon atoms; each $X_m$ is independently a bromine or chlorine; m is 0 to 4; and n is 1 to about 30. Examples of suitable di- or polyfunc tional aromatic phosphorus-containing compounds include resorcinol tetraphenyl diphosphate (RDP), the bis(diphenyl) phosphate of hydroquinone and the bis(diphenyl)phosphate of bisphenol-A, respectively, their oligomeric and polymeric counterparts, and the like.

Other exemplary suitable flame retarding compounds containing phosphorus-nitrogen bonds, include phosphonitrilic chloride, phosphorus ester amides, phosphoric acid amides, phosphonic acid amides, phosphinic acid amides, and tris (aziridinyl)phosphine oxide. When present, phosphorus-containing flame retardants are generally present in amounts of about 1 to about 20 parts by weight, based on 100 parts by weight of the total resin in the final composition.

In one embodiment, the flame retarding polyester composition includes a flame retarding quantity of one or a mixture of nitrogen-containing flame retardants such as triazines, guanidines, cyanurates, and isocyanurates. Suitable triazines have the formula

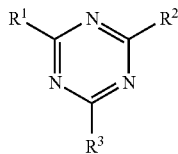

wherein $R^1$, $R^2$, and $R^3$ are independently $C_{1-12}$ alkyl, $C_{1-12}$ alkoxyl, $C_{6-12}$ aryl, amino, $C_{1-12}$ alkyl-substituted amino, or hydrogen. Highly suitable triazines include 2,4,6-triamine-1, 3,5-triazine (melamine, CAS Reg. No. 108-78-1), melamine derivatives, melam, melem, melon, ammeline (CAS Reg. No. 645-92-1), ammelide (CAS Reg. No. 645-93-2), 2-ureidomelamine, acetoguanamine (CAS Reg. No. 542-02-9), benzoguanamine (CAS Reg. No. 91-76-9), and the like. Salts/adducts of these compounds with boric acid or phosphoric acid can be used in the composition. Examples include melamine pyrophosphate and melamine polyphosphate. Suitable cyanurate/isocyanurate compounds include salts/adducts of the triazine compounds with cyanuric acid, such as melamine cyanurate and any mixtures of melamine salts.

Suitable guanidine compounds include guanidine; aminoguanidine; and the like; and their salts and adducts with boric acid, carbonic acid, phosphoric acid, nitric acid, sulfuric acid, and the like; and mixtures comprising at least one of the foregoing guanidine compounds.

The nitrogen-containing flame retardants are often used in combination with one or more phosphorous-based compounds, for example the phosphinates and diphosphinates set forth in U.S. Pat. No. 6,255,371 to Schosser et al. Specific phosphinates include aluminum diethylphosphinate (DE-PAL), and zinc diethylphosphinate (DEPZN). The phosphinates have the formula (1)

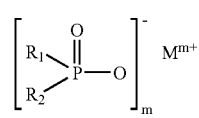

and/or formula (2),

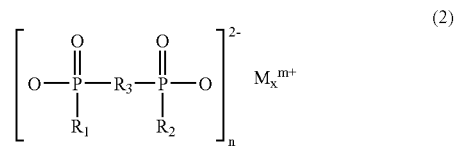

and or polymers comprising units derived from formulas (1) or (2), wherein $R_1$ and $R_2$ are the same or different, and are H, $C_{1-6}$ alkyl (linear or branched), and/or aryl; $R_3$ is $C_{1-10}$ alkylene, (linear or branched), $C_{6-10}$ arylene, $C_{6-10}$ alkylarylene or $C_{6-10}$ arylalkylene; M is any metal, e.g., magnesium, calcium, aluminum or zinc, m is 1, 2 or 3; n is 1, 2 or 3; and x is 1 or 2. In one embodiment, $R_1$ and $R_2$ can be H. This results in a hypophosphite, a subset of phosphinate, such as calcium hypophosphite, aluminum hypophosphite, and the like.

The flame retardants are typically used with a synergist, particularly inorganic antimony compounds. Such compounds are widely available or can be made in known ways. Typical inorganic synergist compounds include $Sb_2O_5$, $SbS_3$, sodium antimonate and the like. Especially suitable is antimony trioxide ($Sb_2O_3$). Synergists such as antimony oxides are typically used in an amount of about 0.5 to 15 by weight, based on the weight of resin in the final composition.

Also, the present composition can contain polytetrafluoroethylene (PTFE) type resins or copolymers, which are used either to reduce dripping in flame retardant thermoplastics or to form fibrillar network in the composition. In one embodiment the fluoropolymer is at least partially encapsulated by an encapsulating thermoplastic polymer, for example PTFE/SAN, synthesized by aqueous emulsion polymerization as disclosed in U.S. Pat. No. 5,804,654.

Flame retardant additives are desirably present in an amount at least sufficient to reduce the flammability of the polyester resin, preferably to a UL94 V-0 rating. The amount will vary with the nature of the resin and with the efficiency of the additive. The amount of the flame retarding component is generally at least 1 wt. %, based on the weight of resin in the final composition. In one embodiment, the amount of the flame retarding component is from 5 wt. % to 30 wt %, based on the weight of resin in the final composition. In another embodiment, the amount of the flame retarding component is from 10 to 20 wt. %, based on the weight of resin in t The composition can further comprise other polymers such as polycarbonates, polyamides, polyolefins, poly(arylene ether)s, poly(arylene sulfide)s, and polyetherimides.

The polyester compositions can be formed by techniques known in the art. The components are typically in powder or granular form, and extruded as a blend, and/or comminuting into pellets or other suitable shapes. The components can be combined in any manner, e.g., by dry mixing or by mixing in the melted state in an extruder, or in other mixers. For example, one embodiment comprises melt blending the components in powder or granular form, extruding the blend, and comminuting into pellets or other suitable shapes. Also included is dry mixing the components, followed by mixing in the melted state in an extruder. The extruder is generally operated at a temperature higher than that necessary to cause the composition to flow. The pellets, so prepared, when cutting the extrudate can be one-fourth inch long or less as desired. Such pellets can be used for subsequent molding, shaping, or forming.

Glass fibers, if present, can be blended first with the polyester and then fed to an extruder and the extrudate cut into pellets, or, in another embodiment, they can be separately fed to the feed hopper of an extruder. For example, the glass fibers can be fed downstream in the extruder to minimize attrition of the glass. The pellets so prepared when cutting the extrudate can be one-fourth inch long or less. As stated previously, such pellets contain finely divided uniformly dispersed glass fibers in the composition. The dispersed glass fibers are reduced in length as a result of the shearing action on the chopped glass strands in the extruder barrel.

The blends of the invention can be formed into shaped articles by a variety of common processes for shaping molten polymers such as injection molding, rotational molding, compression molding, extrusion, thermoforming, blow molding, and gas assist injection molding. Examples of such articles include electrical connectors, enclosures for electrical equipment, automotive engine parts, components for electronic devices, lighting sockets and reflectors, electric motor parts, power distribution equipment, communication equipment, and the like, including devices that have molded in snap fit connectors. The modified polyester resins can also be made into films and sheets.

The polyester compositions are further illustrated by the following non-limiting examples. All blend components in the Tables below are in percent by weight, based on the total weight of the blend components. Examples of the invention are designated "En" and comparative examples are designated "Cn" where n stands for the number of the example. Components are shown in Table 1 below.

All polyester compositions except where indicated are compounded on a 62.5 millimeter single screw extruder with a vacuum vented mixing screw, at a barrel and die head temperature between 240 and 265° C., and a screw speed of 100 revolutions per minute. The extrudate was cooled through a water bath, and then pelletized. test articles were molded on a van Dorn molding machine with a set temperature of approximately 250° C., and the pellets were dried for 3-4 hours at 120° C. in a forced air-circulating oven before injection molding. It will be recognized by one skilled in the art that the method is not limited to these temperatures or to this apparatus.

Capillary viscosity was measured using ASTM D3835 or ISO D11433. Dried pellets were extruded through a capillary Rheometer and the force at varied shear rates was determined to estimate the shear viscosity.

Tensile properties were tested on type I tensile bars at 23° C. with a crosshead speed of 50 mm (2 inches) per minute according to ASTM D638.

Notched Izod testing was performed on 3×½×⅛ inch (76× 13×3 mm) bars according to ASTM D256 at 23° C.

Unnotched Izod testing was done on 3×½×⅛ inch (76× 13×3 mm) bars according to ASTM D4812 at 23° C.

The flexural bars were tested for flexural properties as per ASTM 790.

The retention of tensile stress at break was calculated by dividing the tensile stress after heat aging at 110° C. and

TABLE 1

| Abbreviation | Material |
|---|---|
| Polyester | Poly(1,4-butylene terephthalate) from the General Electric Company, having intrinsic viscosity of 0.7 deciliters per gram, measured in a 60:40 phenol/tetrachloroethane mixture. |
| Glass | E glass with diameter of 10 to 13 micrometers. Sizing-coated glass fibers are commercially available from Owens Corning Fiberglass as, for example, OCF K filament glass fiber 183F. |
| Aromatic epoxide 1 | (structure shown) from Hexion Specialty Chemical, with an epoxy equivalent molecular weight of 525 to 550; or Bisphenol-A epoxy resin received from Dow Chemical Co. under the trade name D.E.R. 661 |
| Aromatic epoxide 2 | High molecular weight bisphenol-A epoxy resin received from Dow Chemical Co. under the trade name D.E.R. 667, with an epoxy equivalent molecular weight of 1600 to 1950. |
| Aliphatic epoxide | 3,4-Epoxycyclohexylmethyl-3,4-epoxycyclohexyl carboxylate from the Dow Chemical Company. |
| Copolyester copolymer | Poly(butylene terephthalate)/poly(tetrahydrofuran) copolymer comprising 48 wt % poly(tetrahydrofuran), obtained from E.I. DuPont de Nemours and Company under the trade name Hytrel 4560. |
| Polyolefin elastomer | Ethylene-methyl acrylate-glycidyl methacrylate terpolymer comprising 8 weight percent glycidyl methacrylate units, produced by Atochem under the trade name Lotader AX8900. |
| Catalyst | Sodium stearate. |
| PETS | Pentaerythritol tetrastearate. |
| Phosphite | 2,4-di-tert-butylphenol phosphite, available as IRGAPHOS 168 from Ciba Geigy. |
| Phenolic AO | Pentaerythritol tetrakis(3,5-di-tert-butyl-4-hydroxyhydrocinnamate), obtained as IRAGANOX 1010 from Ciba Geigy. |

100% relative humidity for the indicated number of days, by the tensile stress of the test sample prior to heat aging, and then multiplying by 100.

Examples 1-2 and Comparative Examples 1-4

The following examples illustrate the advantages in retention of tensile stress gained when a polyester composition comprises an aromatic epoxide, and either a copolyester copolymer or an epoxy-functionalized polyolefin-based elastomer.

These examples display good short time retention, up to 71% for comparative example 3 after 120 hours, and 69% for comparative example 4 after 48 hours, however the long term retention is disadvantageous, being 27% for comparative example 3 and 45% for comparative example 4 after 504 hours.

Inventive examples 1 and 2 represent polyester compositions comprising a combination of an aromatic epoxy compound, and either a copolyester copolymer or an epoxy-functionalized polyolefin-based elastomer. Both examples

TABLE 2

| Component | C1 | C2 | C3 | C4 | E1 | E2 |
|---|---|---|---|---|---|---|
| Polyester | 70.00 | 63.00 | 67.00 | 65.00 | 64.00 | 64.00 |
| Glass | 30.00 | 30.00 | 30.00 | 30.00 | 30.00 | 30.00 |
| Aromatic epoxide 1 | 0 | 0 | 3.00 | 5.00 | 3.00 | 3.00 |
| Aliphatic epoxide | 0 | 1.50 | 0 | 0 | 0 | 0 |
| Copolyester copolymer | 0 | 0 | 0 | 0 | 3.00 | 0 |
| Polyolefin elastomer | 0 | 0 | 0 | 0 | 0 | 3.00 |
| Catalyst | 0 | 0.05 | 0.05 | 0.05 | 0.05 | 0.05 |
| PETS | 0.10 | 0.10 | 0.10 | 0.10 | 0.10 | 0.10 |
| Phosphite | 0.05 | 0.05 | 0.05 | 0.05 | 0.05 | 0.05 |
| Phenolic AO | 0.06 | 0.06 | 0.06 | 0.06 | 0.06 | 0.06 |
| Properties | | | | | | |
| Capillary viscosity at 250° C. and 664/s (Pa-s) | 233 | 199 | 236 | 243 | 211 | 251 |
| Capillary viscosity at 250° C. and 1520/s (Pa-s) | 169 | 140 | 166 | 154 | 138 | 156 |
| Tensile modulus (GPa) | 10.5 | 9.4 | 11.0 | 12.2 | 10.5 | 11.5 |
| Tensile stress at break (MPa) | 116 | 124 | 124 | 127 | 121 | 119 |
| Flexural modulus (GPa) | 7.85 | 8.46 | 8.31 | 8.78 | 8.24 | 8.04 |
| Flexural stress at break (MPa) | 181 | 197 | 193 | 198 | 191 | 186 |
| Notched Izod (J/m) | 74.5 | 80.3 | 77.4 | 80.9 | 80.3 | 87.3 |
| Unnotched Izod (J/m) | 599 | 499 | 669 | 613 | 616 | 827 |
| Retention of tensile stress after heat aging (%) | | | | | | |
| After 48 hours | 78 | 53 | 84 | 69 | 82 | 87 |
| After 120 hours | 51 | 51 | 71 | 59 | 75 | 79 |
| After 168 hours | 29 | 52 | 63 | 51 | 67 | 73 |
| After 336 hours | 21 | 49 | 37 | 49 | 63 | 68 |
| After 504 hours | 16 | 55 | 27 | 45 | 57 | 60 |

It can be seen from Table 2 that compared to comparative example 1, which represents a polyester composition free of epoxides and copolyester copolymers, the addition of an aliphatic epoxide in comparative example 2 increases the long term hydrolytic resistance, as shown by the retention of tensile stress after heat aging for more than 168 hours, however the short term hydrolytic resistance is disadvantageous, and has a value of 53% after 48 hours when compared to 78% in comparative example 1. Comparative examples 3 and 4 represent polyester compositions comprising different types of aromatic epoxide, but which are free of copolyester copolymer and epoxy-functionalized polyolefin-based elastomer.

display excellent short-term and long-term retention properties. The retention of tensile stress is 82% after 48 hours for example 1, and 57% after 504 hours, while that of example 2 is 87% after 48 hours, and 60% after 504 hours.

Examples 3-6 and Comparative Examples 5-8

The following examples illustrate the advantages gained in terms of hydrolytic resistance when a combination of all three of an aromatic epoxide, a copolyester copolymer, and an epoxy-functionalized polyolefin copolymer are used in polyester compositions.

TABLE 3

| Component | C5 | C6 | E3 | E4 | C7 | E5 | C8 | E6 |
|---|---|---|---|---|---|---|---|---|
| Polyester | 70.00 | 67.00 | 61.00 | 59.00 | 59.00 | 53.00 | 52.00 | 46.00 |
| Glass | 30.00 | 30.00 | 30.00 | 30.00 | 30.00 | 30.00 | 30.00 | 30.00 |
| Aromatic epoxide 1 | 0 | 3.00 | 3.00 | 5.00 | 0 | 0 | 0 | 0 |
| Aromatic epoxide 2 | 0 | 0 | 0 | 0 | 10.00 | 10.00 | 17.00 | 17.00 |
| Copolyester copolymer | 0 | 0 | 3.00 | 3.00 | 0 | 3.00 | 0 | 3.00 |
| Polyolefin elastomer | 0 | 0 | 3.00 | 3.00 | 0 | 3.00 | 0 | 3.00 |
| Catalyst | 0 | 0.05 | 0.05 | 0.05 | 0.05 | 0.05 | 0.05 | 0.05 |
| PETS | 0.10 | 0.10 | 0.10 | 0.10 | 0.10 | 0.10 | 0.10 | 0.10 |

TABLE 3-continued

| Component | C5 | C6 | E3 | E4 | C7 | E5 | C8 | E6 |
|---|---|---|---|---|---|---|---|---|
| Phosphite | 0.05 | 0.05 | 0.05 | 0.05 | 0.05 | 0.05 | 0.05 | 0.05 |
| Phenolic AO | 0.06 | 0.06 | 0.06 | 0.06 | 0.06 | 0.06 | 0.06 | 0.06 |
| Properties | | | | | | | | |
| Capillary viscosity at 250° C. and 664/s (Pa-s) | 256 | 236 | 266 | 583 | 292 | 637 | 413 | 402 |
| Capillary viscosity at 250° C. and 1520/s (Pa-s) | 170 | 166 | 183 | 264 | 165 | 338 | 238 | 237 |
| Tensile modulus (GPa) | 9.7 | 11.0 | 9.4 | 10.0 | 11.0 | 10.0 | 11.0 | 10.6 |
| Tensile stress at break (MPa) | 112 | 123 | 111 | 114 | 118 | 119 | 114 | 114 |
| Flexural modulus (GPa) | 8.30 | 8.31 | 7.78 | 8.00 | 8.48 | 8.00 | 8.65 | 7.99 |
| Flexural stress at break (MPa) | 176 | 193 | 177 | 179 | 181 | 182 | 181 | 170 |
| Notched Izod (J/m) | 71.5 | 77.4 | 105.0 | 86.7 | 89.1 | 96.5 | 87.2 | 84.1 |
| Unnotched Izod (J/m) | 529 | 669 | 862 | 796 | 491 | 846 | 299 | 703 |
| Retention of tensile stress after heat aging (%) | | | | | | | | |
| After 48 hours | 74 | 84 | 90 | 89 | 74 | 82 | 63 | 83 |
| After 120 hours | 48 | 71 | 88 | 84 | 71 | 83 | 53 | 73 |
| After 168 hours | 32 | 63 | 84 | 81 | 64 | 76 | 50 | 69 |
| After 336 hours | 26 | 37 | — | 58 | 64 | 71 | 50 | 68 |
| After 504 hours | 17 | 27 | — | 71 | 43 | 53 | 36 | 49 |

It can be seen from Table 3 that inventive examples 3-6 show substantial increase in hydrolytic resistance when compared to comparative examples 5-8, which do not comprise either of the copolyester copolymer or the epoxy-functionalized polyolefin-based elastomer. Examples 3 and 4 displayed a 90% and 89% retention of tensile stress respectively after heat aging for 48 hours, compared to only 84% for comparative example 6. Examples 3 and 4 also displayed an 84% and 81% retention of tensile stress respectively after heat aging for 504 hours, compared to only 63% for comparative example 6. Example 5 displayed a retention of tensile stress after heat aging for 48 hours and 120 hours of 82% and 83% respectively, compared to 74% and 71% for comparative example 7. Example 6 displayed a retention of tensile stress after heat aging for 48 hours and 120 hours of 83% and 73% respectively, compared to 63% and 53% for comparative example 8.

Examples 7-8 and Comparative Examples 9-10

The following examples illustrate the improvement in hydrolytic resistance when the copolyester copolymer is used in combination with either an aromatic epoxy compound or an epoxy-functionalized polyolefin-based elastomer.

TABLE 4

| Component | C9 | C10 | E7 | E8 |
|---|---|---|---|---|
| Polyester | 70.00 | 67.00 | 66.00 | 63.00 |
| Glass | 30.00 | 30.00 | 30.00 | 30.00 |
| Aromatic epoxide 1 | 0 | 0 | 1.00 | 1.00 |
| Copolyester copolymer | 0 | 3.00 | 3.00 | 3.00 |
| Polyolefin elastomer | 0 | 0 | 0 | 3.00 |
| Catalyst | 0 | 0 | 0.05 | 0.05 |
| PETS | 0.10 | 0.10 | 0.10 | 0.10 |
| Phosphite | 0.05 | 0.05 | 0.05 | 0.05 |
| Phenolic AO | 0.06 | 0.06 | 0.06 | 0.06 |
| Properties | | | | |
| Capillary viscosity at 250° C. and 664/s (Pa-s) | 199 | 194 | 241 | 268 |
| Capillary viscosity at 250° C. and 1520/s (Pa-s) | 150 | 144 | 172 | 180 |
| Tensile modulus (GPa) | 10.8 | 11.2 | 10.7 | 10.4 |
| Tensile stress at break (MPa) | 118 | 116 | 117 | 110 |
| Flexural modulus (GPa) | 8.38 | 8.44 | 8.33 | 7.90 |
| Flexural stress at break (MPa) | 182 | 182 | 186 | 176 |
| Notched Izod (J/m) | 77.4 | 82.3 | 88.2 | 106 |
| Unnotched Izod (J/m) | 551 | 667 | 734 | 860 |
| Retention of tensile stress after heat aging (%) | | | | |
| After 48 hours | 75 | 79 | 85 | 89 |
| After 120 hours | 54 | 62 | 74 | 81 |
| After 168 hours | 43 | 40 | 66 | 71 |

It can be seen that in comparative example 10, where the copolyester copolymer is used without any of either the aromatic epoxide of the epoxy-functionalized polyolefin-based elastomer, the retention of tensile stress after heat aging is inferior to that of examples 7-9, where the copolyester copolymer was used in combination with an aromatic epoxy compound (example 7), or both an aromatic epoxy compound and epoxy-functionalized polyolefin copolymer (example 8).

Examples 9-11 and Comparative Examples 11-12

The following examples illustrate improvements in hydrolytic resistance when the polyester compositions are filled with only 15.00 weight percent glass.

TABLE 5

| Component | C11 | C12 | E9 | E10 | E11 |
|---|---|---|---|---|---|
| Polyester | 84.80 | 81.70 | 78.70 | 78.70 | 75.70 |
| Glass | 15.00 | 15.00 | 15.00 | 15.00 | 15.00 |
| Aromatic epoxide 1 | 0 | 3.00 | 3.00 | 3.00 | 3.00 |
| Copolyester copolymer | 0 | 0 | 3.00 | 0 | 3.00 |
| Polyolefin elastomer | 0 | 0 | 0 | 3.00 | 3.00 |
| Catalyst | 0 | 0.05 | 0.05 | 0.05 | 0.05 |
| PETS | 0.10 | 0.10 | 0.10 | 0.10 | 0.10 |
| Phosphite | 0.05 | 0.05 | 0.05 | 0.05 | 0.05 |
| Phenolic AO | 0.06 | 0.06 | 0.06 | 0.06 | 0.06 |
| Properties | | | | | |
| Capillary viscosity at 250° C., 664/s (Pa-s) | 145 | 155 | 139 | 161 | 149 |

TABLE 5-continued

| Component | C11 | C12 | E9 | E10 | E11 |
|---|---|---|---|---|---|
| Capillary viscosity at 250° C., 1520/s (Pa-s) | 104 | 109 | 102 | 116 | 112 |
| Tensile modulus (GPa) | 8.35 | 6.26 | 6.51 | 6.22 | 5.65 |
| Tensile stress at break (MPa) | 103.0 | 79.8 | 81.1 | 87.7 | 85.4 |
| Flexural modulus (GPa) | 6.14 | 5.17 | 5.03 | 4.84 | 4.44 |
| Flexural stress at break (MPa) | 163 | 149 | 145 | 144 | 134 |
| Notched Izod (J/m) | 70.0 | 51.9 | 51.9 | 52.4 | 50.5 |
| Unnotched Izod (J/m) | 372 | 259 | 224 | 253 | 255 |
| Retention of tensile stress after heat aging (%) | | | | | |
| After 48 hours | 85 | 88 | 95 | 86 | 85 |
| After 120 hours | 56 | 82 | 87 | 80 | 81 |
| After 168 hours | 35 | 76 | 83 | 80 | 77 |
| After 336 hours | 21 | 56 | 80 | 73 | 74 |
| After 432 hours | 15 | 34 | 74 | 55 | 52 |

It can be seen from Table 5 that although initial retention of tensile stress in comparative examples 11 and 12 is favorable, as displayed by the 85% and 88% respective retention values after 48 hours of heat aging, this retention decreases in the long term to 21% after 336 hours and 15% after 432 hours for comparative example 11, and 56% after 336 hours and 34% after 432 hours for comparative example 12.

On the other hand, examples 9-11 display excellent short term and long term hydrolytic resistance. Example 9 displays a 95% retention of tensile stress after 48 hours of heat aging, 87% after 120 hours, and 74% after 432 hours. Example 10 displays 86% retention after 48 hours, 80% after 120 hours, and 55% after 432 hours. Example 11 displays 85% retention after 48 hours, 81% after 120 hours, and 52% after 432 hours.

Examples 12-14 and Comparative Examples 13-14

The following examples illustrate the improvement in hydrolytic resistance gained when a combination of an aromatic epoxide and either a copolyester copolymer or an epoxy-functionalized polyolefin copolymer are used in polyester compositions filled with both glass and mica.

TABLE 6

| Component | C13 | C14 | E12 | E13 | E14 |
|---|---|---|---|---|---|
| Polyester | 69.80 | 66.70 | 63.70 | 63.70 | 60.70 |
| Glass | 15.00 | 15.00 | 15.00 | 15.00 | 15.00 |
| Mica | 15.00 | 15.00 | 15.00 | 15.00 | 15.00 |
| Aromatic epoxide 1 | 0 | 3.00 | 3.00 | 3.00 | 3.00 |
| Copolyester copolymer | 0 | 0 | 3.00 | 0 | 3.00 |
| Polyolefin elastomer | 0 | 0 | 0 | 3.00 | 3.00 |
| Catalyst | 0 | 0.05 | 0.05 | 0.05 | 0.05 |
| PETS | 0.10 | 0.10 | 0.10 | 0.10 | 0.10 |
| Phosphite | 0.05 | 0.05 | 0.05 | 0.05 | 0.05 |
| Phenolic AO | 0.05 | 0.05 | 0.05 | 0.05 | 0.05 |
| Properties | | | | | |
| Capillary viscosity at 250° C., 664/s (Pa-s) | 168 | 169 | 168 | 170 | 192 |
| Capillary viscosity at 250° C., 1520/s (Pa-s) | 127 | 125 | 119 | 123 | 133 |
| Tensile stress at break (MPa) | 88.0 | 89.4 | 85.7 | 85.5 | 80.6 |
| Flexural modulus (GPa) | 8.26 | 8.38 | 7.65 | 7.12 | 7.00 |
| Flexural stress at break (MPa) | 135 | 139 | 135 | 134 | 128 |
| Notched Izod (J/m) | 43.7 | 43.7 | 43.7 | 43.7 | 47.6 |
| Unnotched Izod (J/m) | 341 | 329 | 330 | 312 | 452normla |

TABLE 6-continued

| Component | C13 | C14 | E12 | E13 | E14 |
|---|---|---|---|---|---|
| Retention of tensile stress after heat aging (%) | | | | | |
| After 48 hours | 71 | 72 | 73 | 75 | 75 |
| After 120 hours | 50 | 67 | 67 | 70 | 70 |
| After 168 hours | 28 | 60 | 65 | 67 | 69 |
| After 336 hours | 18 | 43 | 62 | 61 | 64 |
| After 432 hours | 15 | 30 | 55 | 50 | 52 |

It can be seen from Table 6 that examples 12-14 display excellent retention of tensile stress in short and long term, whereas comparative examples 13 and 14 display good retention properties only in the short term, which is 48 hours for the former, and 120 hours for the latter.

While the invention has been illustrated and described in typical embodiments, it is not intended to be limited to the details shown, since various modifications and substitutions are possible without departing from the spirit of the present invention. As such, modifications and equivalents of the invention herein disclosed can occur to persons skilled in the art using no more than routine experimentation, and all such modifications and equivalents are within the spirit and scope of the invention as defined by the following claims.

The invention claimed is:

1. A composition, comprising:
   a polyester;
   an aromatic epoxy compound, in an amount sufficient to provide 5 to 300 milliequivalents of epoxy per kilogram of polyester; and
   from 0.5 to 6 weight percent, based on the weight of the polyester,
   an epoxy-functional polyolefin; and
   a copolyester copolymer, wherein the copolyester comprises, based on the weight of the copolyester,
      15 to 95 weight percent of polyester units derived from the reaction of a C6-C24 aromatic dicarboxylic acid or a chemical equivalent thereof with a C2-C6 aliphatic diol, and
      5 to 85 weight percent of polyester units derived from the reaction of a C6-C24 aromatic dicarboxylic acid or a chemical equivalent thereof with a poly(alkylene oxide) glycol having a molecular weight of 400 to 6,000 and a carbon to oxygen ratio from 2.0 to 4.3.

2. The composition of claim 1, wherein an article comprising the composition has an initial tensile stress at break, and wherein the article retains 8000 or more of the initial tensile stress at break after aging at 110° C. at 1075 mmHg (0.143 Mpa) for 48 hours at 100% relative humidity, wherein the tensile stress at break is measured in accordance with ASTM D638.

3. The composition of claim 1, wherein an article comprising the composition has an initial tensile stress at break, and wherein the article retains 70% or more of the initial tensile stress at break after aging at 110° C. at 1075 mmHg (0.143 Mpa) for five days at 100% relative humidity, wherein the tensile stress at break is measured in accordance with ASTM D638.

4. The composition of claim 1, wherein an article comprising the composition has an initial tensile strength, and wherein the article retains more of the initial tensile strength after aging at 110° C. at 1075 mmHg (0.143 Mpa) for 120 hours at 100% relative humidity relative to a composition without the aromatic epoxy compound and epoxy-functional polyolefin and/or copolyester, wherein the tensile strength is measured in accordance with ASTM D638.

5. The composition of claim 1, wherein the polyester is poly(ethylene terephthalate), poly(1,4-butylene terephthalate), poly(ethylene naphthalate), poly(butylene naphthalate), (polytrimethylene terephthalate), poly(1,4-cyclohexylenedimethylene 1,4-cyclohexanedicarboxylate), poly(1,4-cyclohexylenedimethylene terephthalate) poly(cyclohexylenedimethylene-co-ethylene terephthalate), or a combination comprising at least one of the foregoing polyesters.

6. The composition of claim 5, wherein the polyester is poly(butylene terephthalate), poly(ethylene terephthalate), a combination of poly(ethylene naphthalate) and poly(butylene naphthalate), or poly(trimethylene terephthalate).

7. The composition of claim 5, wherein the polyester is poly(butylene terephthalate).

8. The composition of claim 1, wherein the aromatic epoxy compound has an epoxy equivalent weight of 100 to 3,000.

9. The composition of claim 1, wherein the aromatic epoxy compound is of the formula

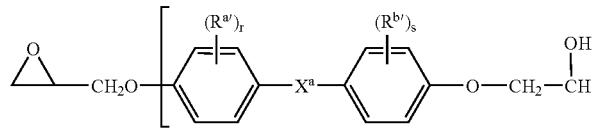

wherein $R^{a'}$ and $R^{b'}$ are each independently halogen or $C_1$-$C_{12}$ alkyl, $X^a$ is a substituted or unsubstituted $C_1$-$C_{18}$ alkylidene bridging group or a substituted or unsubstituted $C_3$-$C_{18}$ cycloalkylidene bridging group, n is 1 to 6, and r and s are each independently 0 to 4.

10. The composition of claim 1, wherein the aromatic epoxy compound is of the formula

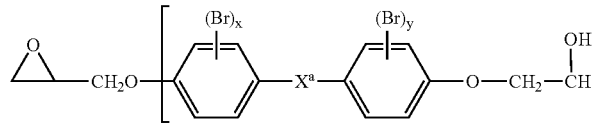

wherein $X^a$ is a substituted or unsubstituted $C_{1-18}$ alkylidene bridging group or a substituted or unsubstituted $C_{3-18}$ cycloalkylidene bridging group, n is 1 to 6, and x and y are each independently 0 to 4.

11. The composition of claim 1, wherein the epoxy-functional polyolefin copolymer comprises units derived from glycidyl (meth)acrylate.

12. The composition of claim 1, wherein the epoxy-functional polyolefin copolymer is a terpolymer comprising units derived from ethylene, glycidyl methacrylate, and methyl acrylate.

13. The composition of claim 1, wherein the $C_2$-$C_6$ aliphatic diol of the copolyester copolymer is butanediol and the poly(alkylene oxide) glycol is poly(tetramethylene oxide) glycol having a molecular weight of 600-2,000.

14. The composition of claim 1, further comprising a catalyst, wherein the catalyst is a hydroxide, hydride, amide, carbonate, borate, phosphate, $C_{2-18}$ enolate, $C_{2-36}$ dicarboxylate, or $C_{2-36}$ carboxylate of a metal; a Lewis acid catalyst; a tetraalkyl ammonium hydroxide or acetate; a $C_{1-36}$ tetraalkyl phosphonium hydroxide or acetate; an alkali or alkaline earth metal salt of a negatively charged polymer; or a combination comprising at least one of the foregoing catalysts.

15. The composition of claim 11, wherein the catalyst is sodium stearate, sodium carbonate, sodium acetate, sodium bicarbonate, sodium benzoate, sodium caproate, potassium oleate, a boron compound, or a mixture comprising at least one of the foregoing salts.

16. The composition of claim 1, further comprising an antioxidant, a particulate filler, a reinforcing filler, a colorant, a mold release agent, a nucleating agent, a UV light stabilizer, a heat stabilizer, a lubricant, or a combination comprising at least one of the foregoing additives.

17. The composition of claim 13, further comprising 5 to 50 weight percent of reinforcing filler, based on the total weight of the composition.

18. The composition of claim 17 wherein reinforcing filler comprises short glass fibers and/or long glass fibers.

19. The composition of claim 1, further comprising 0.1 to 30 weight percent of an acrylic impact modifier, based on the total weight of the composition.

20. The composition of claim 19, wherein the acrylic impact modifier comprises a multi-phase composite interpolymer comprising 25 to 95 weight percent of a first acrylic electrometric phase polymerized from a monomer system comprising 75 to 99.8% by weight $C_1$ to $C_{14}$ alkyl acrylate, 0.1 to 5% by weight crosslinking member, 0.1 to 5% by weight graftlinking monomer, said crosslinking monomer being a polyethylenically unsaturated monomer having a plurality of addition polymerizable reactive groups and 75 to 5 weight percent of a final, rigid thermoplastic acrylic or methacrylic phase polymerized in the presence of said elastomer.

21. The composition of claim 1 further comprising a polycarbonate, polyamide, polyolefin, polyphenylene ether, polyphenylene sulfide, or polyetherimide.

22. The composition of claim 1, wherein the composition further comprises a flame retarding component.

23. An article comprising the composition of claim 1.

24. The article of claim 23, in the form of a component of an automotive part.

25. A method of forming an article, comprising shaping, extruding, or molding the composition of claim 1 to form the article.

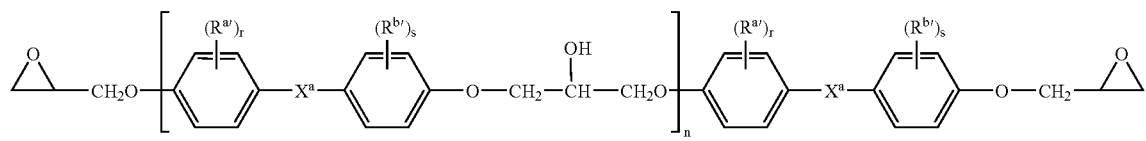

26. A method of forming a composition, comprising blending the components of the composition of claim 1.

27. A composition, comprising:
(a) a polyester component selected from the group consisting of poly(ethylene terephthalate), poly(1,4-butylene terephthalate), poly(ethylene naphthalate), poly(butylene naphthalate), (polytrimethylene terephthalate), poly(1,4-cyclohexylenedimethylene 1,4-cyclohexanedicarboxylate), poly(1,4-cyclohexylenedimethylene terephthalate) poly(cyclohexylenedimethylene-co-ethylene terephthalate), and combinations thereof;
(b) a glass filler;
(c) a aromatic epoxy compound is of the formula

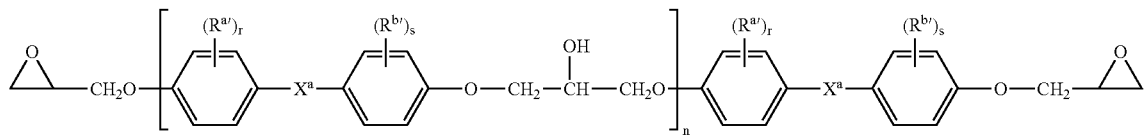

wherein $X^a$ is a substituted or unsubstituted $C_{1-18}$ alkylidene bridging group or a substituted or unsubstituted $C_{3-18}$ cycloalkylidene bridging group, n is 1 to 6, and x and y are each independently 0 to 4, in an amount sufficient to provide 5 to 300 milliequivalents of epoxy per kilogram of polyester;

an alkali metal salt of a $C_8$-$C_{36}$ carboxylic acid catalyst; and 0.5 to 6 weight percent, based on the weight of the polyester, of both of
(d) an ethylene-methyl acrylate-glycidyl methacrylate terpolymer and
a copolyester copolymer wherein the copolyester comprises, based on the weight of the copolyester, (e) 15 to 95 weight percent of polyester units derived from the reaction of terephthalic acid or chemical equivalent thereof with butanediol, and
(f) 5 to 85 weight percent of polyester units derived from the reaction of a terephthalic acid and poly(tetramethylene oxide) glycol having a molecular weight of 600-2,000.

28. A composition, comprising:
a polybutylene terephthalate polyester;
a glass filler;
an aromatic epoxy compound is of the formula wherein $X^a$ is isopropylidene, n is 1 to 6, and x and y are each independently 0 to 2, in an amount sufficient to provide 5 to 300 milliequivalents of epoxy per kilogram of polyester;

an alkali metal salt of a $C_8$-$C_{36}$ carboxylic acid catalyst; and 0.5 to 6 weight percent, based on the weight of the polyester, of both of
an ethylene-methyl acrylate-glycidyl methacrylate terpolymer and
a copolyester copolymer wherein the copolyester comprises, based on the weight of the copolyester, 15 to 95 weight percent of polyester units derived from the reaction of terephthalic acid or chemical equivalent thereof with butanediol, and 5 to 85 weight percent of polyester units derived from the reaction of a terephthalic acid and poly(tetramethylene oxide) glycol having a molecular weight of 600-2,000.

* * * * *

UNITED STATES PATENT AND TRADEMARK OFFICE
CERTIFICATE OF CORRECTION

PATENT NO.         : 7,612,130 B2                                    Page 1 of 1
APPLICATION NO.    : 11/581247
DATED              : November 3, 2009
INVENTOR(S)        : Sung Dug Kim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 377 days.

Signed and Sealed this

Nineteenth Day of October, 2010

David J. Kappos
*Director of the United States Patent and Trademark Office*